United States Patent Office 3,379,758
Patented Apr. 23, 1968

3,379,758
PHOSGENATION OF N-ARYLSULFONYL,N'-ALKYL-UREAS TO PRODUCE ARYLSULFONYL ISOCYANATES
Henri Ulrich, Northford, Conn., assignor to The Upjohn Company, Kalamazoo, Mich., a corporation of Delaware
No Drawing. Continuation-in-part of application Ser. No. 365,150, May 5, 1964. This application July 31, 1967, Ser. No. 657,724
6 Claims. (Cl. 260—545)

ABSTRACT OF THE DISCLOSURE

Arylsulfonyl monoisocyanates and arylsulfonyl diisocyanates are produced by a novel process which comprises mixing in the range 0° to 175° C., phosgene and an arylsulfonylurea of the formula $Ar(SO_2NHCONHR)_n$, wherein $n$ is one or two, R is alkyl of one to 8 carbon atoms, inclusive, and Ar is phenyl or phenylene, unsubstituted or substituted with one or two substituents selected from the class consisting of alkyl of one to 8 carbon atoms, inclusive, cycloalkyl of 3 to 8 carbon atoms, inclusive, phenyl, naphthyl, aralkyl of 7 to 10 carbon atoms, inclusive, alkoxy of one to 8 carbon atoms, inclusive, halogen, nitro, cyano, sulfo, amino, dialkylamino of 2 to 12 carbon atoms, inclusive, and alkoxycarbonyl of 2 to 8 carbon atoms, inclusive.

CROSS REFERENCE TO RELATED APPLICATION

This application is a continuation-in-part of my copending application Ser. No. 365,150, filed May 5, 1964 and now abandoned.

DESCRIPTION

This invention relates to a novel process for producing arylsulfonyl isocyanates.

Arylsulfonyl isocyanates, including monoisocyanates and diisocyanates, are known in the art, and are useful for a variety of purposes. They are especially useful to stabilize organic isocyanates and polyisocyanates in accord with my U.S. Patent No. 3,330,849. They are useful to prepare solid urea derivatives of primary amines and solid urethane derivatives of alcohols, and thus are useful to identify and characterize those amines and alcohols. The arylsulfonyl monoisocyanates are useful as reactants in the production of medicinal agents, e.g., hypoglycemic agents, and to limit chain length in polyurethane and polyurea manufacture. When substituted by an isocyanato moiety, the arylsulfonyl monoisocyanates are useful as sole or partial polyisocyanate components in the production of useful polyurethanes and polyureas by interaction with polyols and polyamines, respectively. The arylsulfonyl diisocyanates are similarly useful as sole or partial polyisocyanate components in the production of useful polyurethanes and polyureas.

The prior are methods for producing sulfonyl isocyanates in some instances involve the use of expensive reactants, e.g., silver cyanate, and often give relatively poor yields of the desired product or are not easily adaptable to the production of polysulfonyl polyisocyanates.

The novel process of this invention for producing an arylsulfonyl isocyanate comprises mixing in the range 0° to 175° C., phosgene and an arylsulfonylurea of the formula:

$$Ar(SO_2NHCOHR)_n \qquad (I)$$

wherein $n$ is an integer 1 or 2, R is alkyl of 1 to 8 carbon atoms, inclusive, and Ar is phenyl or phenylene, unsubstituted or substituted with one or two substituents selected from the group consisting of alkyl of one to 8 carbon atoms, inclusive, cycloalkyl of 3 to 8 carbon atoms, inclusive, phenyl, napthyl, aralkyl of 7 to 10 carbon atoms, inclusive, alkoxy of one to 8 carbon atoms, inclusive, halogen, nitro, cyano, sulfo, amino, dialkylamino of 2 to 12 carbon atoms, inclusive, and alkoxycarbonyl of 2 to 8 carbon atoms, inclusive.

The arylsulfonyl isocyanates produced by said novel process will have the formula:

$$Ar(SO_2NCO)_n \qquad (II)$$

wherein $n$ and Ar are as defined above except that when amino is present as a substituent on Ar in the Formula I sulfonylurea reactant, each amino will be transformed by said process to an isocyanato moiety.

Arylsulfonylureas of Formula I are known in the art or can be prepared by methods known in the art, for example, by interaction of the corresponding sulfonamide, $Ar(SO_2NH_2)_n$, and an alkyl isocyanate, RNCO, wherein Ar, $n$, and R are as given above. It is especially advantageous to prepare the Formula I sulfonylurea reactant in that manner, since during the novel process of this invention, an alkyl isocyanate, RNCO, is obtained as a by-product. That isocyanate can easily be recovered and used to prepare additional sulfonylurea reactant.

Examples of alkyl of one to 8 carbon atoms, inclusive, are methyl, ethyl, propyl, butyl, pentyl, hexyl, heptyl, octyl, and isomeric forms thereof. Examples of cycloalkyl of 3 to 8 carbon atoms, inclusive, are cyclopropyl, cyclobutyl, cyclopentyl, cyclohexyl, cycloheptyl, and cyclooctyl. Examples of aralkyl of 7 to 10 carbon atoms, inclusive, are benzyl, phenethyl, 2-phenylethyl, 2-phenylpropyl, and 3-phenylpropyl. Examples of alkoxy of one to 8 carbon atoms, inclusive, are methoxy, ethoxy, propoxy, butoxy, pentyloxy, hexyloxy, heptyloxy, octyloxy, and isomeric forms thereof. Examples of halogen are fluorine, chlorine, bromine, and iodine. Examples of dialkylamino of 2 to 12 carbon atoms, inclusive, are dimethylamino, N-methylethylamino, diethylamino, N-methylpropylamino, dibutylamino, N - methylisobutylamino, dihexylamino, N-ethyloctylamino, and the like. Examples of alkoxycarbonyl of 2 to 8 carbon atoms, inclusive are methoxycarbonyl, ethoxycarbonyl, propoxycarbonyl, butoxycarbonyl, pentyloxycarbonyl, hexyloxcarbonyl, heptyloxycarbonl, and isomeric forms thereof. Naphthl includes 1-napthyl and 2-naphthyl.

When preparing sulfonyl isocyanates by the novel process of this invention, at least one molecular equivalent of phosgene should be reacted with each molecular equivalent of the sulfonylurea reactant. It is preferred to use a slight to moderate excess of phosgene, i.e., about 1% to about 200% by weight beyond the theoretical amount, to ensure that each sulfonylurea moiety is contacted by a full molecular equivalent of phosgene. When amino is attached to phenyl or phenylene in the sulfonylurea reactant, an appropriately larger molecular proportion of phosgene should be used.

The novel process of this invention is preferably carried out by mixing the sulfonylurea reactant with the necessary amount of phosgene in the range about 0° to about 175° C. It is often advantageous to mix equivalent amounts of phosgene and Formula I sulfonylurea reactant in the range about 0° to about 35° C., and then to heat the resulting mixture in the range about 100° to about 175° C. while adding small additional amounts of phosgene to replace that which escapes from the reaction vessel. A useful alternative procedure involves gradual mixing of phosgene and sulfonylurea in the range about 75° to about 100° C., followed by a relatively short heating period in the range about 125° to about 175° C. It is also advantageous to use a liquid diluent which does not itself react appreciably with phosgene. Suitable diluents are the normally liquid aromatic hydrocarbons and halogenated hydrocarbons, e.g., benzene, toluene, the xylenes, ethylbenzene, cymene, cumene, mesitylene, chlorobenzene, dichlorobenzene, and the like. The amount of diluent is not critical, sufficient being used to give a solution or mobile slurry at the reaction temperature. It is usually advantageous to choose a diluent which will boil at the maximum desired reaction temperature.

The time required for this novel reaction will depend upon such factors as the nature of the sulfonylurea reactant, the nature and amount of diluent, and the reaction temperature. With a reaction temperature in the range about 75° to about 140° C., a reaction time about 15 to about 300 minutes is usually sufficient.

The desired sulfonyl isocyanate can usually be isolated by purging any excess phosgene from the reaction mixture with a stream of an inert gas, e.g., nitrogen or argon, followed by fractional distillation to separate diluent, isocyanate, and sulfonyl isocyanate. The latter can then be purified by conventional techniques, e.g., fractional distillation or recrystallization. If desired, the isocyanate by-product can also be isolated and purified by conventional techniques, and then used to prepare additional sulfonylurea starting material.

The invention can be more fully understood from the following examples.

Example 1.—p-Tolylsulfonyl isocyanate

Phosgene (20.9 g.; 0.21 mole) was added gradually during 30 minutes to a stirred solution of 1-butyl-3-(p-tolylsulfonyl)-urea (54 g.; 0.2 mole) in 500 ml. of chlorobenzene with cooling to maintain the resulting mixture at about 25° C. The mixture was then heated with continued stirring at the boiling point under reflux for 30 minutes. A slow stream of phosgene was passed below the surface of the reaction mixture during that reflux period. Excess phosgene was then removed by purging with nitrogen. Butyl isocyanate and solvent were separated from the resulting clear solution by distillation. The residual solution was then distilled at reduced pressure to give 35 g. of p-tolylsulfonyl isocyanate; B.P. 100–106° C. at 1.8 mm.

Example 2.—p-Tolylsulfonyl isocyanate

Phosgene (150 g.; 1.5 moles) was added to a stirred solution of 1-butyl-3-(p-tolylsulfonyl)urea (270 g.; 1.0 mole) in 1350 ml. of chlorobenzene in the range 80° to 100° C. over a period of 150 minutes. The addition was accompanied by a vigorous evolution of hydrogen chloride. The resulting mixture was then heated to the boiling point and excess phosgene was removed by purging with nitrogen for 30 minutes. Distillation of the chlorobenzene and n-butyl isocyanate, followed by vacuum distillation of the residue gave 168.5 g. of p-tolylsulfonyl isocyanate; B.P. 119–120° C. at 4 mm.

Example 3.—p-Chlorophenylsulfonyl isocyanate

Phosgene (4.0 g.; 0.04 mole) was added gradually during 10 minutes to a stirred solution of 1-propyl-3-(p-chlorophenylsulfonyl)urea (9.5 g.; 0.035 mole) in 95 ml. of chlorobenzene with cooling to maintain the resulting mixture at about 25° C. The mixture was then heated with continued stirring at the boiling point under reflux for 30 minutes. A slow stream of phosgene was passed below the surface of the reaction mixture during that reflux period. Excess phosgene was then removed by purging with nitrogen. Propyl isocyanate and chlorobenzene were removed by distillation at reduced pressure, and the residue was distilled to give 4.4 g. of p-chlorophenylsulfonyl isocyanate; B.P. 94–95° C. at 0.8 mm.

Example 4.—4-Methyl-m-phenylenedisulfonyl diisocyanate

A solution of phosgene (4.1 g.; 0.041 mole) in 30 ml. of chlorobenzene was added gradually during 8 minutes to a stirred solution of 1,1'-[(4-methyl-m-phenylene)disulfonyl]bis[3-butylurea](9.0 g.; 0.02 mole) in 60 ml. of chlorobenzene with cooling to maintain the mixture in the range about 8° to 10° C. The resulting mixture was then boiled under reflux with stirring for 20 minutes. A slow stream of phosgene was passed below the surface of the reaction mixture during that reflux period. Excess phosgene was then removed by purging with nitrogen. Chlorobenzene and butyl isocyanate were removed by distillation, and the resulting residue was distilled at reduced pressure to give 2.3 g. of 4-methyl-m-phenylenedisulfonyl diisocyanate; B.P. 171–175° C. at 1.8 mm.

Example 5.—m-Isocyanatophenylsulfonyl isocyanate 1-butyl-3-metanilylurea (40 g.; 0.15 mole) was added gradually during 7 minutes to a stirred solution of phosgene (30 g.; 0.3 mole) in 400 ml. of chlorobenzene with cooling to maintain the mixture in the range about 0° to 5° C. After stirring for an additional 10 minutes without cooling, a slow stream of phosgene was passed into the reaction mixture while the latter was heated to boiling and boiled under reflux for 60 minutes. Excess phosgene was then removed by purging the hot mixture with nitrogen, and the reaction mixture was filtered. Chlorobenzene and butyl isocyanate were removed from the filtrate by distillation, and the resulting residue was distilled at reduced pressure to give 15.3 g. of m-isocyanatophenylsulfonyl isocyanate; B.P. 135–136° C. at 1.1 mm.

Example 6.—p-Isocyanatophenylsulfonyl isocyanate 1-butyl-3-sulfanilylurea (27.1 g.; 0.1 mole) was added gradually during 6 minutes to a stirred solution of phosgene (19.8 g.; 0.2 mole) in 270 ml. of chlorobenzene with cooling to maintain the mixture in the range about 0° to 5° C. After stirring for an additional 10 minutes without cooling, a slow stream of phosgene was passed into the reaction mixture while the latter was heated to boiling and boiled under reflux for 90 minutes. Excess phosgene was then removed by purging with nitrogen, and the reaction mixture was filtered. Chlorobenzene and butyl isocyanate were removed from the filtrate by distillation, and the resulting residue was distilled at reduced pressure to give 14.4 g. of p-isocyanatophenylsulfonyl isocyanate; B.P. 115–120° C. at 0.4 mm.; M.P. 40–44° C.

Following the procedure of Example 1 but using in place of the 1-butyl-3-(p-tolylsulfonyl)urea as a reactant, 1 - butyl - 3-phenylsulfonylurea, 1-ethyl-3-(2,4-xylyl)sulfonylurea, 1-hexyl-3-(p-tert-butylphenyl)sulfonylurea, 1-pentyl-3-(m-octylphenyl)sulfonylurea, 1-octyl-3-(p-cyclohexylphenyl)sulfonylurea, 1 - butyl - 3-(4-cyclopentyl-3-butylphenyl)sulfonylurea, 1 - butyl - 3-(p-biphenylyl)sulfonylurea, 1 - propyl - 3-(p-benzylphenyl)sulfonylurea, 1-heptyl-3-(m-methoxyphenyl)sulfonylurea, 1 - isopropyl-3-(2,4 - dichlorophenyl)sulfonylurea, 1 - butyl - 3-(p-nitrophenyl)sulfonylurea, 1 - butyl-3-(4-chloro-3-nitrophenyl)sulfonylurea, 1 - isohexyl-3-(3-cyanophenyl)sulfonylurea, and 1 - butyl - 3 - (p-dimethylaminophenyl)sulfonylurea, there are obtained phenyl isocyanate, 2,4-xylyl isocyanate, p-tert-butylphenyl isocyanate, m-octylphenyl isocyanate, p-cyclohexylphenyl isocyanate, 4 - cyclopentyl - 3 - butylphenyl isocyanate, p-biphenylyl isocyanate, p-benzylphenyl isocyanate, m-methoxyphenyl isocyanate, 2,4-dichlorophenyl isocyanate, p-nitrophenyl isocyanate, 4-chloro-3-nitrophenyl isocyanate, 3-cyanophenyl isocyanate, and p-dimethylaminophenyl isocyanate, respectively.

Following the procedure of Example 4 but using in place of 1,1'-[(4-methyl-m-phenylene)disulfonyl]bis[3-butylurea], 1,1' - (m - phenylenedisulfonyl)bis[3 - butylurea], 1,1'-(p-phenylenedisulfonyl)bis[3-butylurea], 1,1'-[(2 - chloro - p - phenylene)-disulfonyl]bis[3-butylurea], and 1,1' - [(4 - methoxy - m-phenylene)-disulfonyl]bis[3-butylurea], there are obtained m-phenylenedisulfonyl diisocyanate, p-phenylenedisulfonyl diisocyanate, 2-chloro-p-phenylenedisulfonyl diisocyanate, and 4-methoxy-m-phenylenedisulfonyl diisocyanate, respectively.

I claim:

1. A process for producing an arylsulfonyl isocyanate which comprises mixing in the range 0° to 175° C., phosgene and a sulfonylurea of the formula $$Ar(SO_2NHCOR)_n$$

wherein $n$ is an integer one or two, R is alkyl of one to 8 carbon atoms, inclusive, and Ar is phenyl or phenylene, unsubstituted or substituted by one or two substituents selected from the class consisting of alkyl of one to 8 carbon atoms, inclusive, cycloalkyl of 3 to 8 carbon atoms, inclusive, phenyl, naphthyl, aralkyl of 7 to 10 carbon atoms, inclusive, alkoxy of one to 8 carbon atoms, inclusive, halogen, nitro, cyano, sulfo, amino, dialkylamino of 2 to 12 carbon atoms, inclusive, and alkoxycarbonyl of 2 to 8 carbon atoms, inclusive.

2. The process of claim 1 wherein Ar is p-tolyl and $n$ is one.

3. The process of claim 1 wherein Ar is p-chlorophenyl and $n$ is one.

4. The process of claim 1 wherein Ar is 4-methyl-m-phenylene and $n$ is two.

5. The process of claim 1 wherein Ar is m-aminophenyl and $n$ is one.

6. The process of claim 1 wherein Ar is p-aminophenyl and $n$ is one.

References Cited

Hentchel, Berichte deut. Chem., vol. 17. Berlin: Commissionsverlag von R. Friedlaender & Sohn., pages 1284–1285 (1884).

Saunders et al., Chem. Reviews, vol. 43. Baltimore: The Williams and Wilkins Co., page 205 (1948).

Siefkin, Annalen der Chemie, vol. 562. Weinheim, Germany: Verlag Chemie G.m.b.H. Pages 6–136 (1949).

LORRAINE A. WEINBERGER, *Primary Examiner.*

H. C. WEGNER, *Assistant Examiner.*

UNITED STATES PATENT OFFICE
CERTIFICATE OF CORRECTION

Patent No. 3,379,758                      April 23, 1968

Henri Ulrich

It is certified that error appears in the above identified patent and that said Letters Patent are hereby corrected as shown below:

Column 1, lines 66 to 68, and Column 5, lines 3 and 4, the formula, each occurrence, should appear as shown below:

$$Ar(SO_2NHCONHR)_n$$

Signed and sealed this 28th day of October 1969.

(SEAL)
Attest:

Edward M. Fletcher, Jr.
Attesting Officer

WILLIAM E. SCHUYLER, JR.
Commissioner of Patents